US005484503A

United States Patent [19]

Grot

[11] Patent Number: 5,484,503

[45] Date of Patent: Jan. 16, 1996

[54] PROCESS FOR SEALING MEMBRANE IN ELECTROCHEMICAL CELL

[75] Inventor: Walther G. Grot, Chadds Ford, Pa.

[73] Assignee: E. I. Du Pont de Nemours and Company, Wilmington, Del.

[21] Appl. No.: 23,218

[22] Filed: Feb. 23, 1993

Related U.S. Application Data

[62] Division of Ser. No. 511,180, Apr. 17, 1990.

[51] Int. Cl.[6] ........................ C09J 5/02

[52] U.S. Cl. ........................ 156/333; 156/108; 204/266; 524/84; 524/167; 524/546

[58] Field of Search ........................ 156/108, 333; 524/84, 167, 546; 204/266

[56] References Cited

U.S. PATENT DOCUMENTS

| | | | |
|---|---|---|---|
| 4,218,275 | 8/1980 | Kadija et al. | 156/333 |
| 4,437,951 | 3/1984 | Bissot et al. . | |

*Primary Examiner*—John J. Gallagher

[57] ABSTRACT

A sealant composition comprises a dispersion of a fluorocarbon polymer with particles no larger than 25 micrometers in a low volatility liquid and up to 50 percent of a higher volatility liquid. Also covered is an applicator for applying the sealant to the gasket of an electrochemical cell.

7 Claims, 1 Drawing Sheet

PROCESS FOR SEALING MEMBRANE IN ELECTROCHEMICAL CELL

This is a division of application Ser. No. 07/511,180, filed Apr. 17, 1990.

FIELD OF INVENTION

This invention relates to a sealant composition and an applicator for applying it to a gasket of an electrochemical cell. The sealant comprises a dispersion of a fluorocarbon polymer having a small particle size in a medium containing a liquid of low volatility which is compatible with the medium.

BACKGROUND

Membrane cells are the state-of-the-art equipment for electrochemical reactions such as the electrolysis of sodium chloride to make chlorine and sodium hydroxide. Some of the cells have very large membranes. Plate-and-frame cells can have an active membrane area of up to 1.5×3.7 meters, which means that the membrane area sealed by the gaskets is even larger. Sealing is a particularly difficult task for the larger membranes, and these cells frequently use ribbed gaskets, with a width of up to 5 cm, between the plate and the membrane.

It is necessary to use a sealant between the gaskets and the membranes at the time the cells are assembled under compressive force, for three reasons:

1. The sealant prevents leakage of the electrolyte during operation. This is particularly important when using state-of-the-art membranes which contain small channels parallel to the dimensions of the planar surface, as taught in U.S. Pat. No. 4,437,951. The sealant must block the end of these channels, and must block capillary leakage down the length of multifilament membrane reinforcement.

2. The sealant lubricates the gasket/membrane interface so the force of closing the cell does not tear the membranes. The use of reinforced gaskets reduces the deformation of the gaskets but does not eliminate the need for lubrication.

3. The sealant provides a release function so the membranes are not damaged during disassembly.

Among the sealants now in use is silicone rubber, which is applied in solution and crosslinks on contact with air. The sealant generally must be allowed to cure for about five hours or more (until it loses its tackiness) without contacting any other surface. This makes application of sealant to vertical gasket assemblies difficult, because there is only a limited amount of free space available when the clamps are fully separated. The silicone sealant is flammable, does not seal membranes with channels from sacrificial fibers, and does not provide adequate release properties. Spilled sealant cannot be removed with water.

Du Pont Krytox® fluorinated grease has advantages over silicone rubber. It is effective as a release agent, can seal membranes with small channels made by removal of sacrificial fibers in the reinforcement of the membrane when using ribbed gaskets, and does not require air drying. This means that in a multicell electrolyzer, the Krytox® can be applied to each gasket and the coated gaskets may touch each other overnight prior to insertion of membranes. This is particularly important with very large cells, where vertical application of gasket sealant is required because the cell frames are too large and heavy to permit horizontal assembly. Further, the Krytox® grease is not flammable.

However, Krytox® grease must be applied with care because spilled sealant cannot be removed with water. Also, achieving leak-free performance is difficult when membranes are reinforced with fabrics made from multifilament yarns and when membranes are installed with flat gaskets.

An improved sealant with the following attibutes is desirable:

1. a low enough viscosity to ease application, but high enough to avoid running, particularly on vertical surfaces, after application;

2. ability to flow into voids, penetrating and plugging channels remaining after removal of sacrificial fibers in the membrane reinforcement and sealing against capillary leakage along the length of multifilament reinforcement fibers, and/or ability to plasticize to a degree a cation exchange membrane so that, upon cell closure, the pressure will urge the cation exchange polymer itself against and even into any voids.

3. effectiveness on flat as well as ribbed gaskets;

4. ease of spill cleanup, preferably with water;

5. compatablity with other sealants, such as Krytox® fluorinated grease, so that the two sealants can touch each other without detriment if the two are being used in the same cell;

6. chemical compatibility with the reactants, materials of construction of the cell, the products and the electrolytic process in general; and 7. cure time low or not required so that adjacent gaskets with sealant applied can touch promptly after application, so an entire large cell can be fitted with gaskets and sealant in one day and assembled with wet membrane the next day.

The sealing composition of the present invention has the desired attributes and is fully suitable for application on gaskets in the vertical as well as horizontal mode. It is particularly effective when applied with the applicator of the present invention.

SUMMARY OF THE INVENTION

The present invention comprises a sealant composition for use in an electrochemical cell comprising a dispersion of a fluorocarbon polymer in which the polymer particles are at most 25 micrometers in diameter in a liquid medium, the liquid medium comprising a liquid of low volatility which is compatible with more volatile liquids in which the fluorocarbon polymers are generally commercially available. The medium should be essentially inert to cell components and to the desired electrochemical reaction. The volatility of the liquid medium should be low enough that the sealant composition does not harden or crack prior to closing the electrolyzer.

Preferably, the sealant composition contains a thickener to make the room temperature viscosity of the sealant such that it can easily be applied to the gasket but will not flow as a result of gravity and, most preferably, contains a thickener that facilitates increases in viscosity with time. The viscosity should be intermediate between that of a water-based paint and that of a paste (such as tooth paste), that is, about 10 to 5000 poises.

More preferably, the sealant composition contains emulsions or dispersions of polyacrylic acids and their homologs and sufficient solid sodium bicarbonate ($NaHCO_3$), to raise the pH from the desired range for mixing the fluoropolymer dispersion and the preferred thickener (a pH below 6) to the preferred pH of application (about 6.5 to 7). It has been found that, in a short time after application, carbon dioxide ($CO_2$) diffuses out of the sealant, raising the pH to 7.5 to 8, thereby causing the sealant to become more viscous. By including a bromthymol blue indicator, pH and, hence, viscosity change can easily be noted by the changes in color of the sealant. In this most preferred embodiment, the viscosity is low during storage and application and increases after application.

It is believed that the smaller particle size polymers are more effective in blocking channels and that the low volatility liquid medium softens the cation exchange membrane so the pressure of cell closure effectively presses the cation exchange polymer against the multifilament fibers and perhaps into the voids of the multifilament fibers.

This sealant can be used on both the anolyte side and the catholyte side or it can be used on one side and Krytox® fluorinated grease can be used on the other side. The present sealant and Krytox® fluorinated grease can, without damage, touch each other during the time when other gaskets are being sealed but before membranes are installed.

Other embodiments of the invention are an applicator and process for applying the sealant to a ribbed or flat gaskets which comprises (a) a means of providing a controlled flow of the sealant to the applicator head and (b) a head which has a grooved section on each side which fits the ribs of the gasket and has a deeper section in the center into which the sealant is urged.

FIGURES

DETAILS OF THE INVENTION

Figure 1:
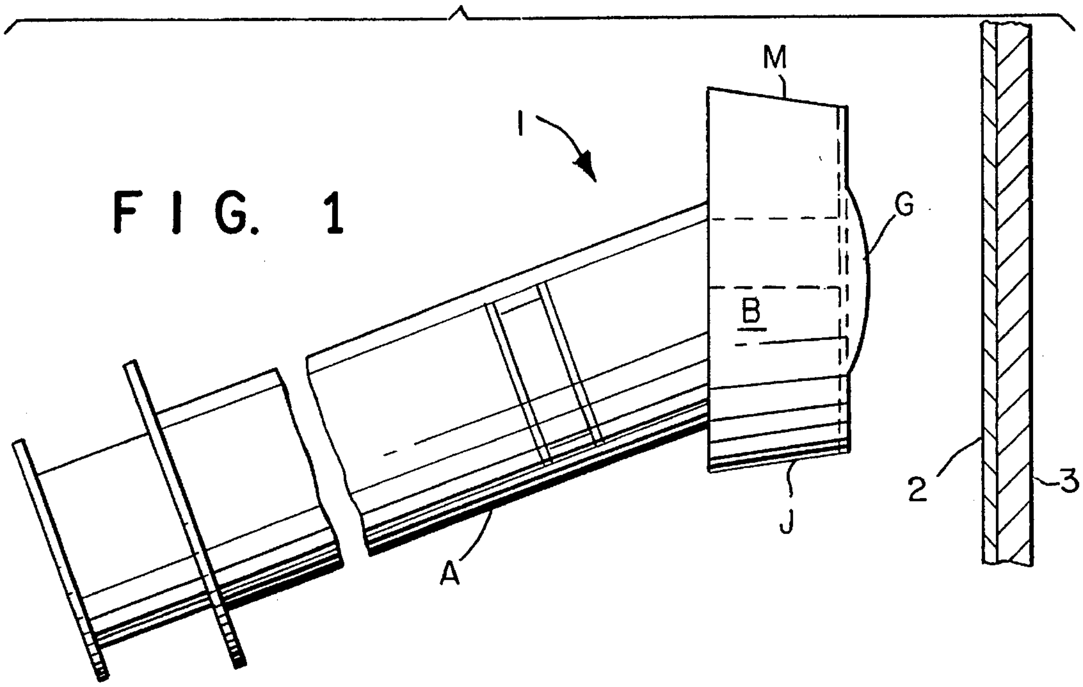
FIG. 1 shows a side view of the applicator and a gasket glued to a plate of a plate-and-frame cell.

The composition of the sealant of the present invention, on a weight percent (wt. %) basis, is suitably:

20–50% fluoropolymer on a dry basis, preferably 30–50% and 0–5% thickener, preferably 1–2% dispersed in an amount of liquid medium chosen to add to 100%, the liquid medium being suitably:

50–100% low-volatility liquid, preferably 75–95%, and 0–50% more volatile liquid, preferably 5–25%.

The ratio of wt. % low-volatility liquid to wt. % fluoropolymer should be at least 1:2.

The fluoropolymer used in making the sealant contains at least 90% fluorine (F) atoms attached to carbon atoms, but may contain small amounts of other atoms normally present in fluoropolymers, such as hydrogen (H) and chlorine (Cl). Preferably, a perfluoropolymer is used, with the proviso that it is satisfactory to have ether linkages (—O—) in the polymer.

Polytetrafluoroethylene is preferred due to its commercial availability and cost for use in the seal ant of the present invention. Also suitable are copolymers of tetrafluoroethylene with perfluoroolefins of 3–10 carbon atoms or with perfluorovinyl perfluoroalkyl ethers with 3–10 carbon atoms. Further, within the equivalents envisioned would be non-fluorine-containing polymers that are hydrophobic and chemically resistant or inert to the reactants, products, equipment and operating conditions.

The fluoropolymer fed to the preparation of the sealant may be a largely aqueous dispersion or an organosol; the former are more readily available. For the purposes of this application, both will be referred to as starting dispersions and references to aqueous dispersions should be construed to include organosols. The amount of liquid in the starting dispersion of fluoropolymer is not critical, but it is preferred to keep the content of liquid low to provide more flexibility in producing the sealant of the present invention. Dispersions of about 60 wt. % fluoropolymer in water are commercially available and are quite suitable. They may contain small amounts of nonionic surfactants and may contain very small amounts of perfluorinated ionic surfactants.

Substantially all the polymer particles in the dispersion should be no larger than 25 micrometers. Preferably the average particle should be no more than 10 micrometers, more preferably no more than 1 micrometer. The most preferred and most readily available dispersions have average particle sizes of 0.1–0.3 micrometers.

A purpose of the low-volatility liquid of the medium is to prevent hardening and cracking of sealant between application to the gasket and installation of the membrane. After the sealant is applied to the gasket it frequently must be exposed to air overnight before membranes are installed. This is particularly true with very large membranes, which must be installed vertically because the cells are too large to move from a horizontal to a vertical position after assembly.

The low-volatility liquid is to prevent evaporation of more than 25 wt. % of the total liquid content of a 0.5 mm coating of the sealant overnight, even in warm, dry weather.

Some low-volatility liquids also dissolve in the cation exchange membrane to some degree during and after assembly. This is believed to soften or plasticize the cation exchange polymer of the membrane, helping it to press close to the surface and perhaps into the fissures of any multifilament reinforcement fibers which may be present. The plasticizing effect is also believed to be helpful in urging the channels remaining from the removal of sacrificial fibers in the membrane reinforcement to dose during pressure assembly of the plate-and-frame cell. Thus, the sealing function is facilitated.

In order for the low-volatility liquid to be sufficiently low in volatility, it should have a boiling point at 5 mm Hg of at least 50° C.

The low-volatility liquid of the medium must be soluble in and compatible with other liquids so as to form a single liquid phase in which the fluoropolymer and any thickener is dispersed. That is to say, the low-volatility liquid must be soluble in and compatible with the liquids in which the fluoropolymer and the optional thickener are normally commercially available. It must not interfere with the desired electrochemical reaction. For use in the preferred thickened composition, it should not be acidic or basic to the extent that it would interfere with the performance of the thickener. It is not necessary for the low-volatility liquid to be inert to the cell electrolytes since only a small amount will be present during assembly of the cell and it may be dissolved out during early minutes of cell operation.

Many low-volatility liquids meet the above requirements. Among them are polyethylene glycols and their alkyl or monoaryl ethers; ethylene glycol and glycerol; dimethyl sulfoxide; dimethyl formamide; and tetramethylene sulfone. In an electrolysis experiment in which various low-volatility liquids were added to the catholyte during electrolysis, tetramethylene sulfone caused very little foaming, which is desirable.

Optionally, a thickener may be used in the sealant. This is not necessary for horizontal assembly of plate-and-frame cells, because the milk-like viscosity of the sealant without thickener would not cause it to run off a horizontal gasket. However, larger cells cannot be assembled horizontally because they are too large and heavy to turn into the operating position in which the membranes are substantially vertical. A much higher viscosity of the sealant is needed to make it suitable for application to a vertical gasket. This viscosity is at least as high as that of water-based paint, approximately 10 poises, and no higher than that of a paste such as toothpaste, approximately 5000 poises. Preferably, the viscosity should be about 20 to 1000 poises.

In addition to whether the assembly is horizontal or vertical, the method of application will be considered by one skilled in the art in selecting the preferred viscosity. The preferred viscosity can be thinner if its application is to be with a brush and thicker if the application is by putty knife or by using the applicator of the present invention.

Any thickener known in the art that is compatible with the liquid medium can be used. For example, gum arabic may be used.

The preferred thickeners are emulsions or dispersions of polyacrylic acids or their homologs. For example Rohm and Haas Acrysol® ASE thickeners or Acrysol® ICS-1 thickener may be used. For the purpose of this patent, both thickener emulsions and thickener dispersions will be referred to as emulsions. These emulsions are quite fluid, suitable for blending with the other components if they are on the acid side of pH 6. Upon increasing the pH of the sealant blend to about 6.5, some of the —COOH groups are converted to —COO$^-$ groups, and the polymer dissolves, causing the viscosity to increase to a paste-like level.

The preferred thickened compositions may be prepared by mixing the fluoropolymer starting dispersion and the thickener emulsion with low-volatility liquid, and, preferably, a trace of bromthymol blue indicator, all at a pH below 6 (with the indicator present the color of the sealant at or below pH 6 will be a yellow color). To this fluid is added solid $NaHCO_3$ until the pH is about 6.5–7 (green color). The polyacrylic acid dissolves and the mixture thickens to a paste, ready to store or apply to gasketing.

When it is applied to gasketing, the $CO_2$ diffuses out, the pH increases to 7.5–8 (blue color) and the sealant becomes still more viscous within 1 to 3 hours, depending upon the thickness of the sealant.

The sealant may be applied with a brash, preferably covering the middle third of the gasket and leaving the outer edges free of sealant to minimize contamination of the membrane and electrolyte. If excess sealant is applied, it may be scraped off with, in the case of a ribbed gasket, a comb designed to leave a thick layer at the desired place and to fit into the ribs of the gasket and remove sealant from the areas where little or no sealant is desired. It may be desirable to leave a little sealant even in the outer edges of the gasket, to minimize leakage and assist in eventual release.

A preferred way to apply the sealant to ribbed gasketing is to use an applicator of this invention which is depicted in the figures. While depicted as a round device, the applicator may have any other geometry so long as the face is essentially flat and sized to fit the gasket upon which the sealant is to be placed.

FIG. 1 depicts the applicator (1) approaching the position to apply sealant to a vertical gasket (2), glued to a plate (3) of a plate-and-frame press (not shown). The applicator is equipped with a feeding device (A) attached to and in fluid communication through an orifice in the head (B) of the applicator. The orifice (C) can best be seen in FIG. 3 which shows the face of the applicator depicted in FIG. 1 and FIG. 2 which shows a cross-section of FIG. 3. As can be seen, particularly in FIG. 3, there are parallel grooves (D) that are molded or machined into the face (E) of the applicator so as to fit closely the ribs (F) of the gasket. Also shown in FIG. 3 are preferred raised lips (G) on opposing edges of the applicator to assist in maintaining the applicator's position with respect to the gasket when in use (the spacing between the lips should be slightly greater than the width of the gasket).

Figure 2:
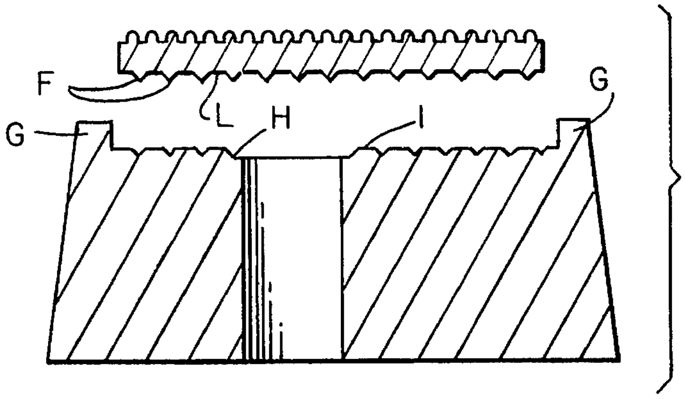
FIG. 2 shows a cross-section of the applicator head in FIG. 3 in relation to a ribbed gasket.
Figure 3:
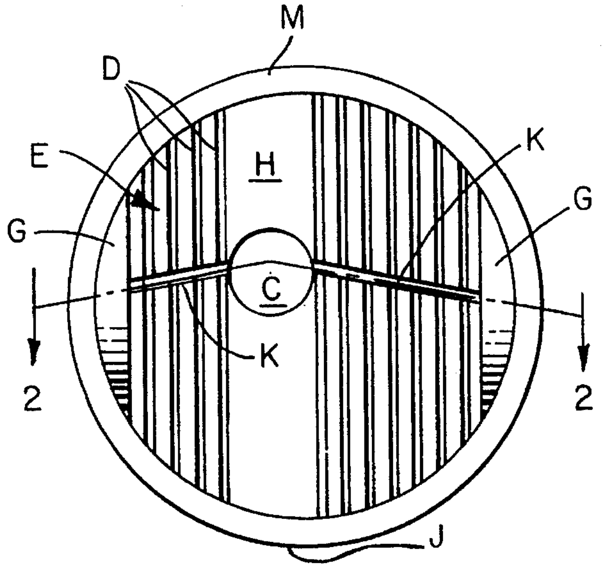
FIG. 3 shows the face of the applicator.

An application slot (H), or area where the peaks (I) have been removed can be seen in FIGS. 2 and 3 in fluid communication with the orifice (C). The slot may be of any depth desired to provide a sealant bead of the desired thickness. The slot may extend fully across the face of the applicator as shown or it may only extend to the trailing edge (J) of the applicator. Preferably, the slot is slightly off center as shown so that the sealant bead will be closer to the outside edge of the gasket thereby minimizing the chance of sealant getting onto the working area of the membrane that will be installed. Thin channels (K) can be cut through the grooves in the applicator to allow a small amount of sealant to be present across the entire width of the applicator. Preferably, the thin channels are slightly angled toward the trailing edge as shown. Then, when the applicator is in use, it will leave a thin layer of sealant across the entire width of the gasket.

In use, the applicator should be held so all its face area is in complete and close contact with the gasket in a manner that the peaks in the face of the applicator align with the valleys (L) in the gasket and, if present, the lips of the applicator are slightly outside the edges of the gasket as shown in FIG. 2. The applicator is slid along the gasket and sealant is fed into the applicator. The feeding device (A) may be a syringe or calking gun or a similar mechanism. Preferably, it should be small enough to be hand-held and fit easily between plates while keeping the face of the applicator flat against the gasket. Sealant in the feeding device is fed through the orifice (C) and into the slot (H) by applying some pressure. If the viscosity of the sealant is precisely adjusted and the application slot only extends to the trailing edge, the motion of the applicator will tend to create a vacuum at the point where the sealant enters the application slot through the orifice and the metering of the sealant will become almost automatic.

As stated above, it may be desirable, particularly for release purposes, to have a thin layer of sealant across the entire face of the gasket. If the preferred thin channels (K) are omitted, this can be done by placing a small bead of sealant across the entire leading edge (M) of the applicator, the edge that first touches the gasket as the applicator is moved along the gasket. This will also result in a very thin layer across the entire gasket.

EXAMPLES

1. An aqueous polytetrafluoroethylene dispersion (65.08 g) with 60% solids, obtained as Teflon® 30 dispersion made by E. I. du Pont de Nemours and Company, was mixed with 15.33 g of glycerol and 11.08 g of Rohm and Haas Acrysol®ICS-1 thickener with magnetic stirring. Sodium bicarbonate (350 mg) was added slowly with magnetic stirring until the mixture was too thick for magnetic stirring. Then it was stirred with a spatula.

2. Teflon® 30 (235 g) dispersion was mixed with 24.1 g Rohm and Haas Acrysol®ICS-1 thickener and 122 g diethylene glycol and 160 mg bromthymol blue. Then 700 mg sodium bicarbonate was added with stirring and the mixture became yellow-green and thick like a paste. On prolonged exposure to air it turned blue-green. It did not solidify on drying overnight.

The composition was applied to both gaskets of a commercial cell to seal a DuPont Nafion® N-90209 perfluorinated membrane, which contained channels from removal of sacrificial fibers. The cell was used to make chlorine and sodium hydroxide under typical commercial conditions for seven (7) days with no leakage. On shutdown, the cell was disassembled and the membrane was released without difficulty.

3. A similar composition was applied to a large commercial cell (1.5×3.7 m), which is still operated under typical commercial conditions after five (5) months with no leakage.

4. The applicator depicted in the Figures without the thin channels was used to apply a similar sealant composition to a 5 cm wide ribbed gasket of a type used commercially. It gave a smooth bead of about 0.5 millimeter (mm) thickness in the central area of the gasket. When a small bead of the sealant was placed across the leading edge of the applicator, the central bead was obtained along with a very thin film of sealant across the entire gasket.

I claim:

1. A process for sealing a membrane to an electrochemical cell gasket comprising: (i) applying a sealant composition to either the membrane, the electrochemical cell gasket or both, wherein the sealant composition comprises (a) 20–50 weight percent fluoropolymer on a dry basis, (b) the fluoropolymer having particles with a diameter no greater than 25 micrometers, (c) 0–5 weight percent thickener dispersed in an amount of a single phase liquid medium chosen to add to 100 weight percent, and (d) the liquid medium comprising 50–100 weight percent of a low-volatility liquid and 0–50 weight percent of a more volatile liquid; and (ii) contacting the membrane and the electrochemical cell gasket so as to form a bond or seal therebetween.

2. The process of claim 1 wherein the ratio of weight percent low-volatility liquid to weight percent fluoropolymer is at least 1:2.

3. The process of claim 1 wherein the fluoropolymer is a copolymer of tetrafluoroethylene and at least one of (a) a terminal perfluoroolefin of 3–10 carbons and (b) a perfluorovinyl perfluoroalkyl ether of 3–10 carbons,

4. The process of claim 1 wherein the low-volatility liquid is a polyethylene glycol or an ether thereof.

5. The process of claim 1 wherein the sealant has a pH during storage and at the time of application of 6.5–7.

6. The process of claim 1 wherein the sealant thickens after application,

7. The process of claim 1 wherein the electrochemical cell is a chloralkali cell or a fuel cell.

* * * * *